United States Patent [19]
Swartz et al.

[11] Patent Number: 5,768,140
[45] Date of Patent: Jun. 16, 1998

[54] RF-INTERROGATABLE PROCESSING SYSTEM

[75] Inventors: Jerome Swartz, Old Field; Charles Wang, Oyster Bay; Joseph Katz, Stony Brook, all of N.Y.

[73] Assignee: Symbol Technologies, Inc., Holtsville, N.Y.

[21] Appl. No.: 667,766

[22] Filed: Jun. 21, 1996

[51] Int. Cl.$^6$ .............................. G06F 17/00; G06G 7/48
[52] U.S. Cl. .................. 364/478.13; 364/478.12; 364/478.14
[58] Field of Search .................. 364/478.12, 478.13, 364/478.14, 478.15, 478.16, 478.11; 340/825.3, 854.6; 209/526, 527; 324/313

[56] References Cited

U.S. PATENT DOCUMENTS

| | | | |
|---|---|---|---|
| 4,471,345 | 9/1984 | Barrett | 340/572 |
| 4,601,394 | 7/1986 | Hunter | 209/3.3 |
| 4,676,343 | 6/1987 | Humble et al. | 186/61 |
| 4,734,713 | 3/1988 | Sato et al. | 346/76 PH |
| 4,746,932 | 5/1988 | Sato | 346/76 PH |
| 4,783,740 | 11/1988 | Ishizawa et al. | 364/403 |
| 5,005,125 | 4/1991 | Farrar et al. | 364/403 |
| 5,031,223 | 7/1991 | Rosenbaum et al. | 382/1 |
| 5,118,929 | 6/1992 | Scata | 235/462 |
| 5,229,134 | 7/1993 | Speckhart et al. | 364/478 |
| 5,280,159 | 1/1994 | Schultz et al. | 231/382 |
| 5,347,463 | 9/1994 | Nakamura et al. | 364/478 |
| 5,383,130 | 1/1995 | Kalisiak | 364/471 |
| 5,459,670 | 10/1995 | Johnson et al. | 364/478 |
| 5,469,363 | 11/1995 | Saliga | 364/478 |
| 5,523,954 | 6/1996 | Weaver et al. | 364/478 |
| 5,594,228 | 1/1997 | Swartz et al. | 235/383 |
| 5,619,416 | 4/1997 | Kosarew | 364/478.13 |

*Primary Examiner*—Joseph Ruggiero
*Assistant Examiner*—Ramesh Patel

[57] ABSTRACT

A system for storing articles having different descriptions in an enclosure and providing the enclosure with an RF-interrogatable unit having stored indications of the descriptions of the stored articles. The unit The system further contemplates interrogating the enclosure's RF-interrogatable unit to determine the enclosure content.

22 Claims, 5 Drawing Sheets

RF-INTERROGATABLE PROCESSING SYSTEM

FIELD OF THE INVENTION

This invention relates generally to article processing and pertains more particularly to article inventorying with the benefit of radio-frequency (RF) tags associated with the articles and having RF readable article identification capacity.

BACKGROUND OF THE INVENTION

RF tags are in widespread usage in such areas as tracking of locations of persons, e.g., doctors in hospitals, parties entering and leaving secured areas, and articles, e.g., as in the case of various known electronic article surveillance systems.

In the person tracking applications, persons wear RF-interrogatable tags which have memory for storing a "preamble", i.e., an introductory message code portion common to the particular person tracking system, and an ensuing message code portion uniquely indicating an identifying coding specific to the person bearing the tag. The tags have further facility for detecting an interrogating RF carrier in which the preamble message code portion is present and respond thereupon with a transmission containing the tag memory content, i.e., the preamble and the person-identifying coding.

In the article surveillance situation, articles are equipped with tags which respond to certain interrogations, e.g., at store or library exits,. to cause RF receivers at such locations to indicate that the article tag has not been deactivated. Tag deactivation customarily occurs at a checkout station, but is sometimes overlooked or ineffectively implemented, such that the tag remains armed to respond to interrogation. The article surveillance tags may be of a type simply resonating in response to incident RF energy, and providing RF detectable energy bearing identifying modulation content, based on a nonlinear element, e.g., a diode in the tag resonant circuit which reacts differently to positive and negative cycles of the system carrier. In article surveillance systems, the responses of all participating tags provide generally identical outputs and do not afford individual article identification as in the case of the person-tracking systems.

SUMMARY OF THE INVENTION

The subject invention has as its primary object to further extend the use of active RF tags in improved article inventory processing.

In broad practice aspect, the invention provides a method for processing articles comprising the steps of defining an article assortment inclusive of articles having different descriptions, distributing the articles into an enclosure and providing the enclosure with an RF-interrogatable unit having stored indications of the descriptions of articles contained therein.

In more particular practice aspect, the invention provides a method for processing articles, comprising the steps of defining an article assortment inclusive of articles having different descriptions, distributing the articles into an enclosure, providing the enclosure with an RF-interrogatable unit having stored indications of the descriptions of articles contained therein and RF-interrogating the enclosure RF- interrogatable unit to determine enclosure article contents.

In broad system aspect, the invention provides a system for processing an article assortment inclusive of articles having different descriptions, comprising an enclosure containing a grouping of the articles and an RF-interrogatable unit with the enclosure and having stored indications of the descriptions of the articles contained therein.

In more particular system aspect, the invention provides a system for processing an article assortment inclusive of articles having different descriptions, comprising an enclosure containing a grouping of the articles, an RF-interrogatable unit with the enclosure and having stored indications of the descriptions of the articles contained therein and RF-interrogating means for RF interrogating the enclosure RF- interrogatable unit to determine enclosure article contents.

The foregoing and other objects and features of the invention will be further understood from consideration of the following detailed description of preferred embodiments and practices and from the drawings, wherein like reference numerals identify like components throughout.

DETAILED DESCRIPTION OF PREFERRED EMBODIMENTS AND PRACTICES

Figure 1:
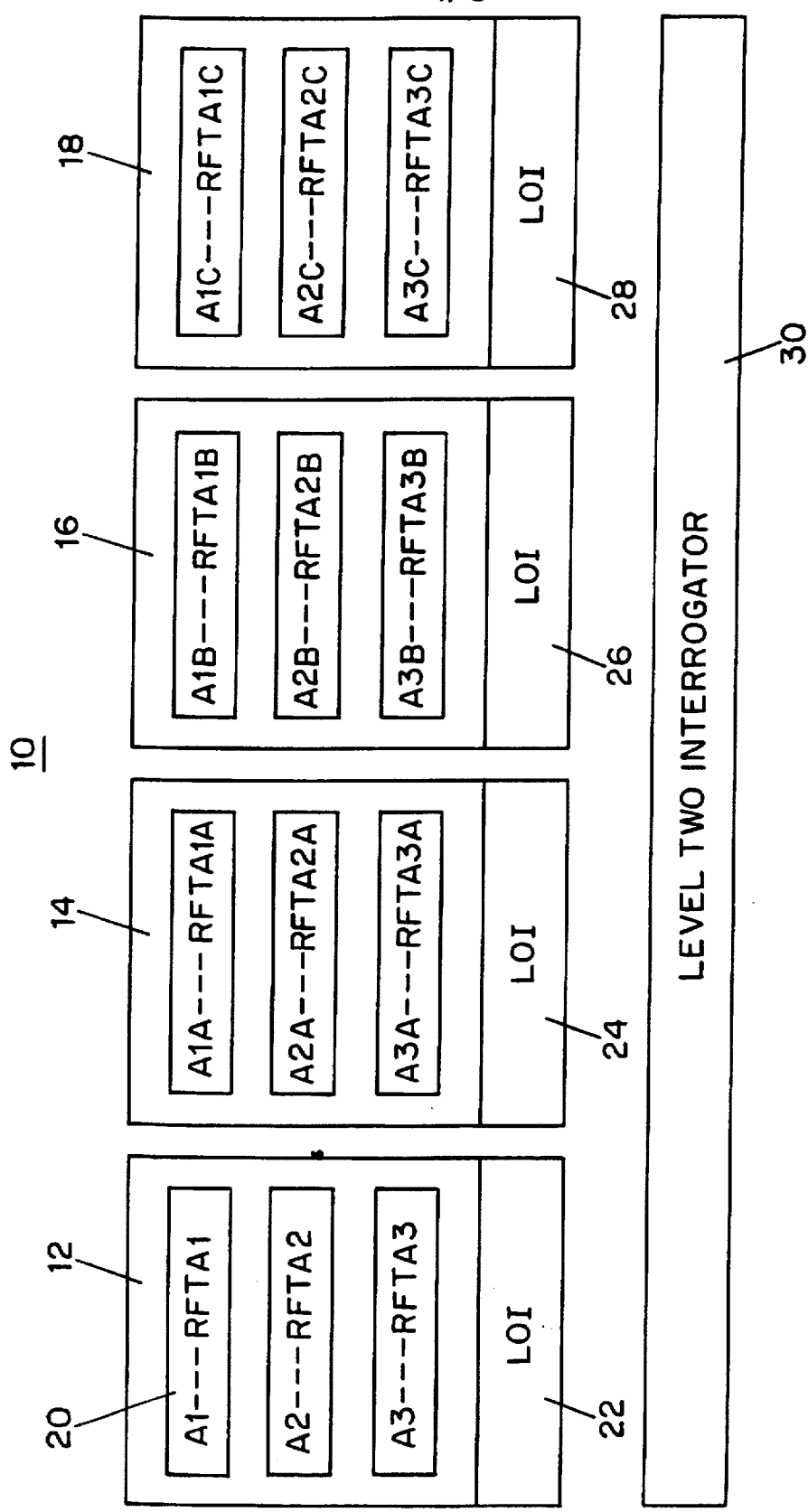
FIG. 1 is a general view of the various components of an arrangement in accordance with the invention.

System 10 of FIG. 1 includes article enclosures or containers 12, 14, 16 and 18. Reference numeral 20 designates tagged article A1 - - - RFTA1, which comprises the article (A1) and an RF tag (RFTA1), and is contained in enclosure 12, along with tagged articles A2 - - - RFTA2 and A3 - - - RFTA3. Enclosure 14 contains tagged articles A1A - - - RFTA1A, A2A - - - RFTA2A and A3 - - - RFTA3. Enclosure 16 contains tagged articles A1B - - - RFTA1B, A2B - - - RFTA2B and A3B - - - RFTA3B. Enclosure 18 contains tagged articles A1C - - - RFTA1C, A2C - - - RFTA2C and A3C - - - RFTA3C. While each enclosure is shown as containing a fully different assortment of articles, an enclosure may contain articles also contained in others of the enclosures.

Reference numerals 22, 24, 26 and 28 designate respectively level one interrogators (LOI), each affixed to a distinct one of enclosures 12, 14, 16 and 18 and disposed so as to interrogate tagged articles in the respective enclosures. LEVEL TWO INTERROGATOR 30 is adapted to interrogate each of interrogators 22, 24, 26 and 28.

Figure 2:
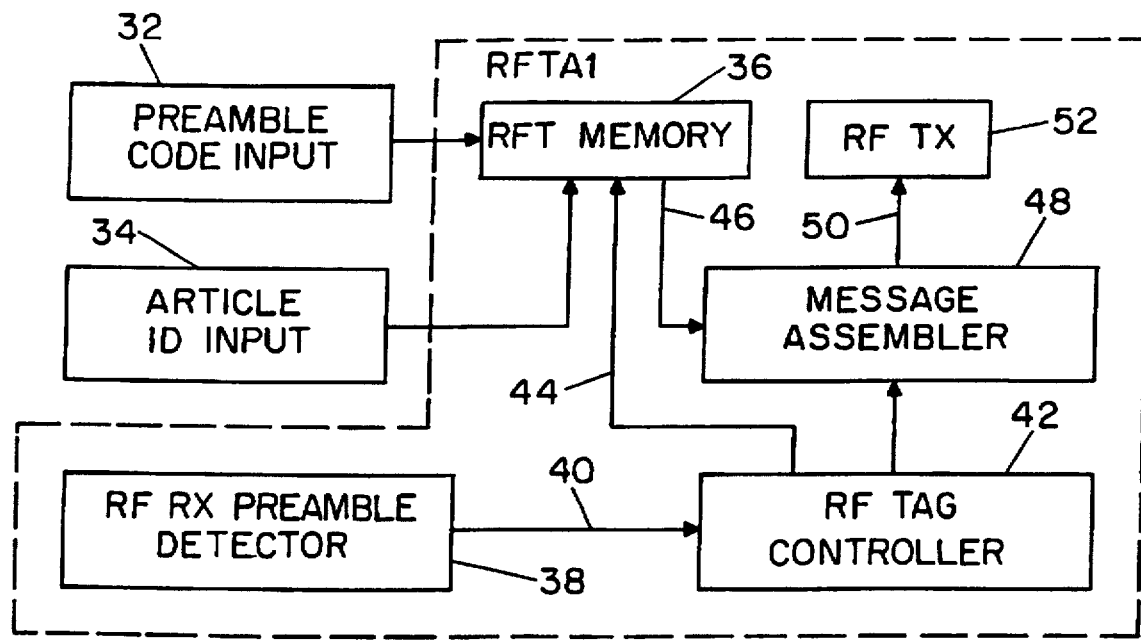
FIG. 2 is a schematic block diagram of an embodiment of the article RF tags (RFT) of FIG. 1, shown together with means for providing preamble code and article identification input to the memory of the article RF tags.

Turning to FIG. 2, RF tag RFTA1 comprises the components bounded by the broken lines. Also shown in FIG. 2 are PREAMBLE CODE INPUT unit 32 and ARTICLE ID INPUT unit 34. Signals transmitted and received in implementing the subject invention are in the form of known technology, involving a radio frequency carrier which has intelligence therein, typically through amplitude modulation or frequency modulation of the carrier. The intelligence is inclusive of a "preamble", which is a common series of bits indicative of a key to participate in the system, and an "ID" (identification) series of bits, which uniquely identifies each system participant. More particularly, in the subject invention, the ID series of bits serves to identify the description of each article encompassed by the system, e.g., in a business supply application, such items as pens, writing tablets, stationary, etc.

The preamble and ID for any given article are input by units 32 and 34 to Radio-Frequency-Tag MEMORY (RFT MEMORY) 36. By way of example, memory 36 may be a ROM (read only memory) into which the preamble and ID are written. Article ID input unit 34 may include a keyboard usable in system set up to key in article descriptions for each participating system article separately, with the system preamble provided by preamble code input unit 32, in to each system tag. Thus, while many tags may be involved in the system, only one set of units 32 and 34 are needed for system setup.

Another tag component, RF RX PREAMBLE DETECTOR 38, receives system interrogation communications and determines whether a received communication includes the system preamble. On each such determination, detector 38 provides indication of the event over line 40 to RF TAG CONTROLLER 42. Controller 42 thereupon provides "read" signals over line 44 to memory 36, which provides its preamble and article ID contents over line 46 to MESSAGE ASSEMBLER 48. This unit generates the system carrier and suitably modulates the same with the preamble and ID of the tagged article and supplies the resulting modulated RF signal over line 50 to RF TX (RF transmitter) 52. A common antenna is used for both tag transmissions and tag receptions, which of course occupy different time periods in system operation.

By the foregoing structure, each of the tagged articles in a given enclosure may be interrogated by its associated LOI interrogator and will furnish an RF signal to the interrogator which identifies the article ID and the article location.

Figure 3:
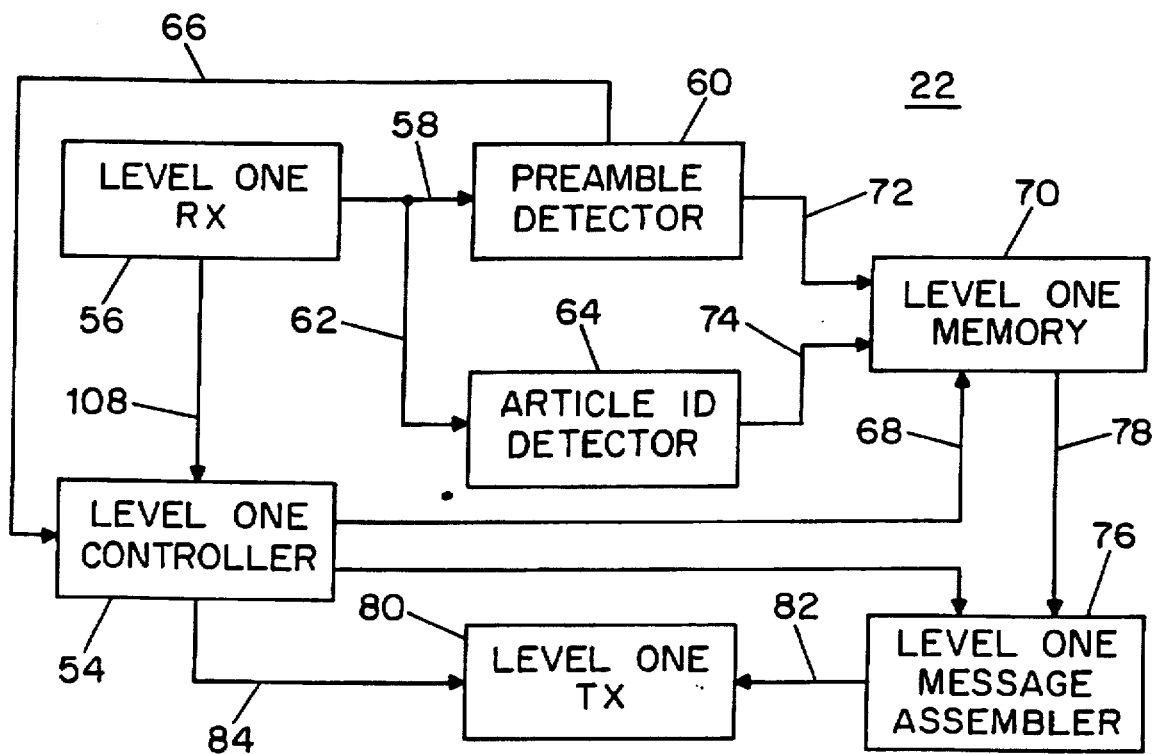
FIG. 3 is a schematic block diagram of an embodiment of the level one interrogators (LOI) of the FIG. 1 arrangement.

Referring to FIG. 3, the structure of each of interrogators 22, 24, 26 and 28 is shown. Turning thereto, interrogator 22 will be seen to include LEVEL ONE CONTROLLER 54 and LEVEL ONE RX (receiver) 56, which furnishes its output signals over line 58 to PREAMBLE DETECTOR 60 and over line 62 to ARTICLE ID DETECTOR 64. Where the system preamble is detected as present in a received transmission, detector 60 so advises controller 54 over line 66 of the event. Controller 54 thereupon provides a signal over line 68 to LEVEL ONE MEMORY 70 for writing therein signals on lines 72 and 74, respectively indicative of the system preamble and the received article ID. This series of events gives rise to storage in the level one interrogators of identification of system participating articles per enclosure.

Remaining components of the level one interrogators are LEVEL ONE MESSAGE ASSEMBLER 76, which receives read out contents of memory 70 over line 78, and LEVEL ONE TX 80, which receives signals over line 82 for transmission to LEVEL TWO INTERROGATOR 30 (FIG. 1), responsively to transmit decisions of controller 54, provided on line 84.

Figure 4:
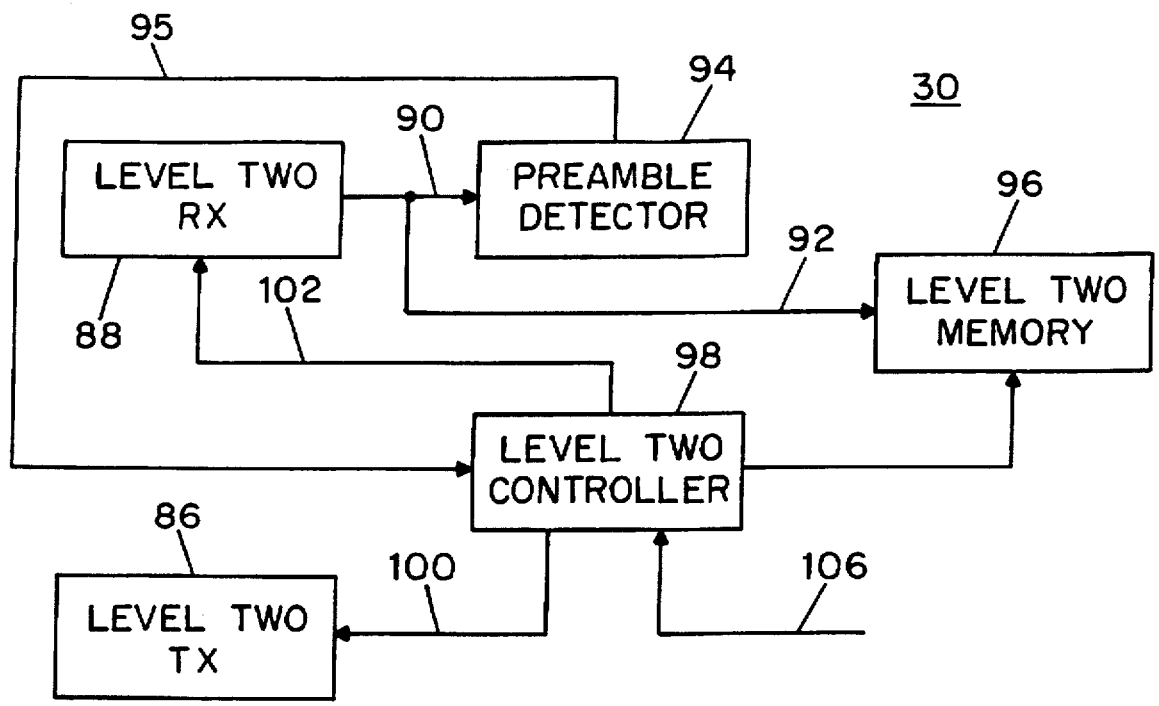
FIG. 4 is a schematic block diagram of an embodiment of the level two interrogator of the FIG. 1 arrangement.

Turning to FIG. 4, interrogator 30 includes LEVEL TWO TX 86, LEVEL TWO RX 88, lines 90 and 92, respectively interconnecting receiver 88 with PREAMBLE DETECTOR 94 and LEVEL TWO MEMORY 96. LEVEL TWO CONTROLLER 98 has connection with components as is indicated by lines 100, 102 and 104. To effect interrogation of the level one interrogators, controller 98 energizes level two transmitter 86 over line 100 and, following a suitable time for the level one interrogation, enables level two receiver 88. Upon detection of the system preamble in received transmissions, preamble detector 60 so informs controller over line 95 and controller 98 enables level two memory 96, by input thereto over line 104, to store the transmitted information indicative of article description and emanating from receiver 88.

At such points in time as its is desired to compile system article description information per enclosure at level two, level two transmitter 86 transmits a command , e.g., individually or sequentially by suitable timing control means, to the level one interrogators to cause them to transmit their memory contents to the level two interrogator for storage in level two memory 96. To this end, user input on line 106 to controller 98 causes level two transmitter 86 to transmit the system carrier with an "interrogate" preamble, different from the system preamble, and level on receiver 56 detects the same and so informs level one controller 54 over line 108.

Returning to the exemplary application of the invention, i.e., to a business supply application, let it be assumed that at a manufacturing and supply location, each article of a given business supply order is provided with its RF-interrogatable tag containing the system preamble and the article description. Further, assume that the articles are encased in various enclosures, each equipped with a first level interrogator as above described and that the first level interrogators have made inquiry by RF interrogation of the articles in the associated enclosure and contain corresponding stored information. A shipment clerk at the manufacturing and supply location now can check the accuracy of the intended shipment simply by interrogating each enclosure and then collectively printing out or otherwise displaying the contents of the second level interrogator memory and checking the same against the order sheet.

Continuing, assume that shipment is made of the ordered articles, so encased, to a user location. Here, the incoming shipment may be checked by the user receiving clerk as in the same manner as noted for the shipment clerk above discussed. At this juncture, the various enclosures are dispersed into various departments of the user location. Now, the responsible clerk at a user department may interrogate the first level interrogator(s) of the enclosure(s) consigned to that department again to readily assure the verity of the shipment per his or her departmental order sheet.

Figure 5:
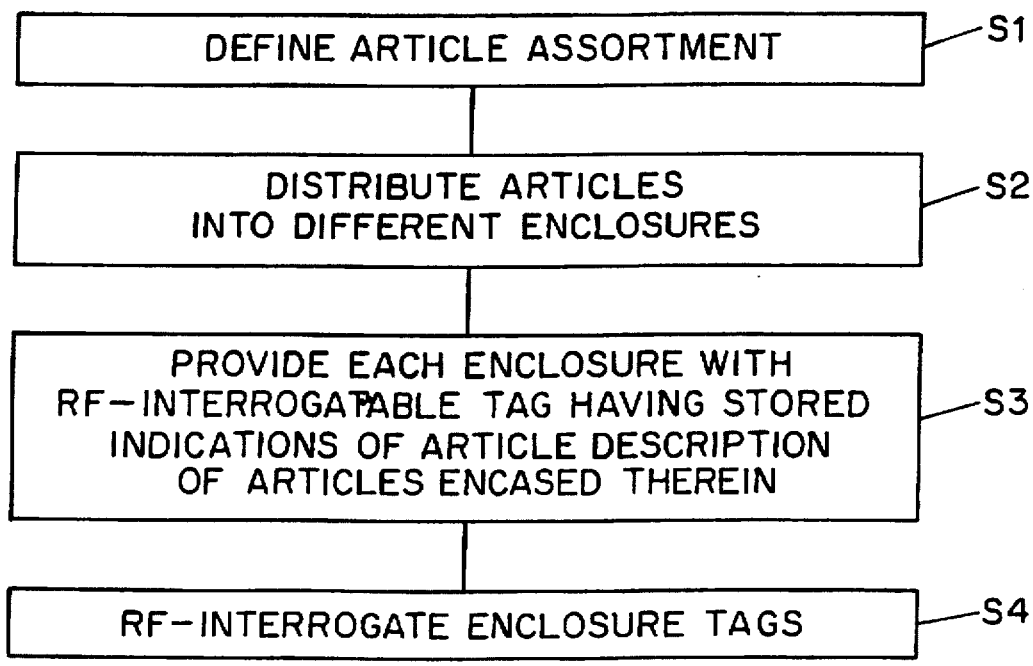
FIG. 5 is a first flow chart of system activity in accordance with the invention.

Turning to FIG. 5, a first practice in accordance with the invention includes outset step S1, DEFINE ARTICLE ASSORTMENT, wherein the assortment, e.g., of orderable business supplies, is collected. In step S2, DISTRIBUTE ARTICLES INTO DIFFERENT ENCLOSURES, the given order of business supplies is dispersed into as many enclosures (shipping cartons) as may be required. In step S3, PROVIDE EACH ENCLOSURE WITH RF-INTERROGATABLE TAG HAVING STORED INDICATIONS OF ARTICLE DESCRIPTION OF ARTICLES ENCASED THEREIN, the respective shipping cartons are provided with respective tags with stored article descriptions specific to the contained articles. In step S4, RF-INTERROGATE ENCLOSURE TAGS, the enclosure tags are interrogated to identify respective shipping carton article contents.

Figure 6:
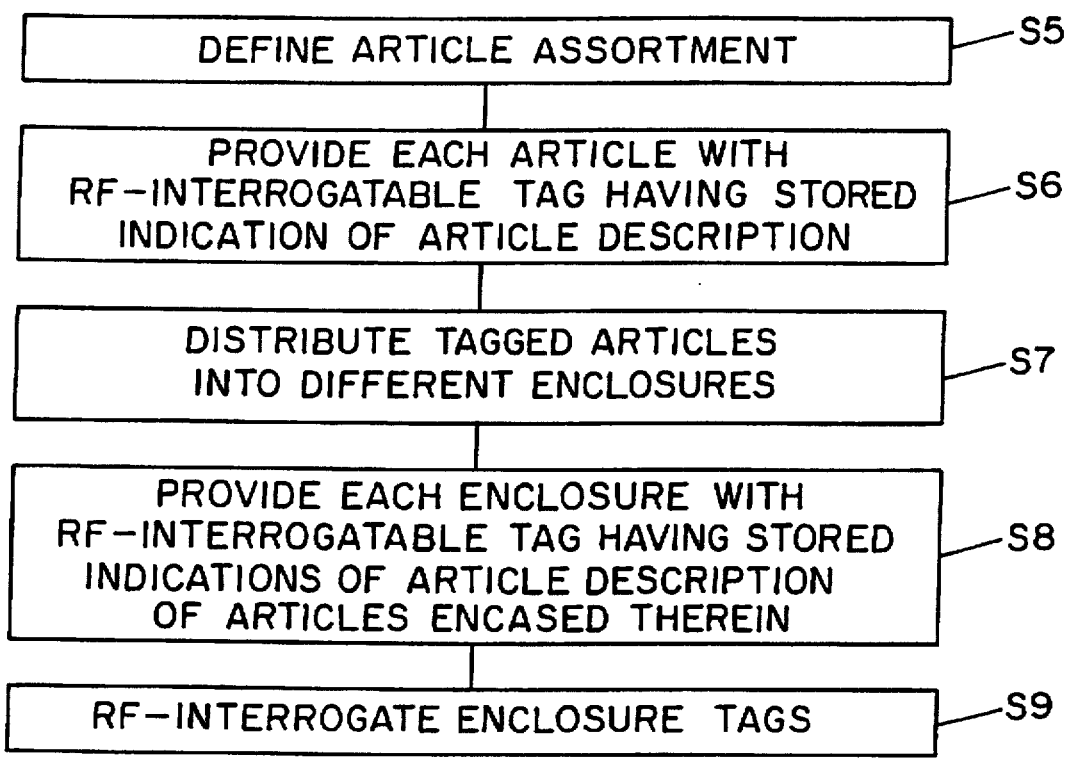
FIG. 6 is a second flow chart of system activity in accordance with the invention.

A more detailed practice of the invention is seen in the flowchart of FIG. 6. Here, step S5, DEFINE ARTICLE ASSORTMENT, is a repeat of step S1 above. In step S6, PROVIDE EACH ARTICLE WITH RF-INTERROGATABLE TAG HAVING STORED INDICATION OF ARTICLE DESCRIPTION, tags of the type described in FIG. 2 are applied to the articles. In step S7, DISTRIBUTE TAGGED ARTICLES INTO DIFFERENT ENCLOSURES, the tagged articles comprising the given order of business supplies are dispersed into as many enclosures (shipping cartons) as may be required. In step S8, PROVIDE EACH ENCLOSURE WITH RF-INTERROGATABLE TAG HAVING STORED INDICATIONS OF ARTICLE DESCRIPTION OF ARTICLES ENCASED THEREIN, step S3 above is practiced. In step S9, RF-INTERROGATE ENCLOSURE TAGS, step S4 above is practiced.

Figure 7:
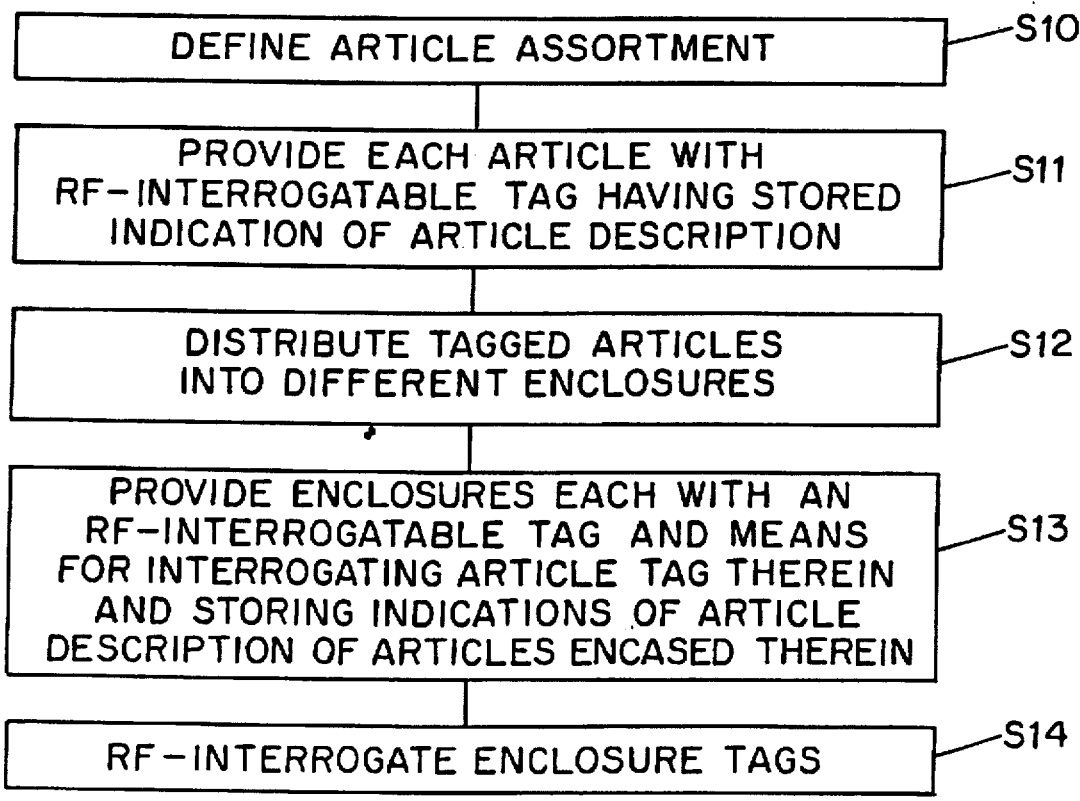
FIG. 7 is a third flow chart of system activity in accordance with the invention.

A further practice in accordance with the invention is seen in the flowchart of FIG. 7. Step S10, DEFINE ARTICLE ASSORTMENT, step S11, PROVIDE EACH ARTICLE WITH RF-INTERROGATABLE TAG HAVING STORED INDICATION OF ARTICLE DESCRIPTION, and step S12, DISTRIBUTE TAGGED ARTICLES INTO DIFFERENT ENCLOSURES, are counterpart to steps S5, S6 and S7 above discussed. Step S13, PROVIDE ENCLOSURES EACH WITH AN RF-INTERROGATABLE TAG AND MEANS FOR INTERROGATING ARTICLE TAGS THEREIN AND STORING INDICATIONS OF ARTICLE DESCRIPTION OF ARTICLES ENCASED THEREIN, is more specific than, e.g., step S8 above. Step S14, RF-INTERROGATE ENCLOSURE TAGS, is a repeat of the above practice closing step.

Figure 8:
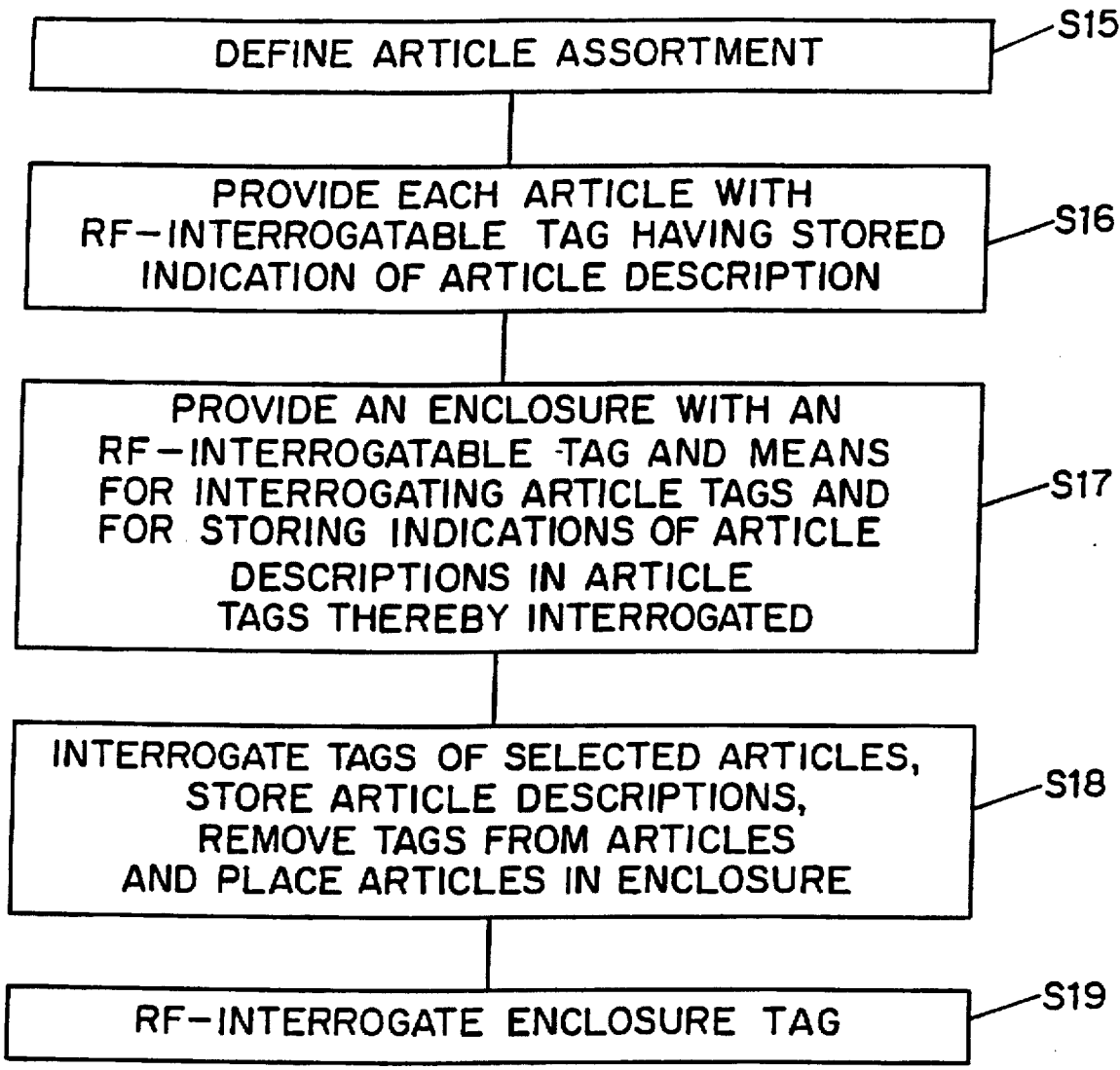
FIG. 8 is a fourth flow chart of system activity in accordance with the invention.

A further variation in practice in accordance with the invention is seen in the flowchart of FIG. 8. Step 15, DEFINE ARTICLE ASSORTMENT, step S16, PROVIDE EACH ARTICLE WITH RF-INTERROGATABLE TAG HAVING STORED INDICATION OF ARTICLE DESCRIPTION, and step S17, PROVIDE AN ENCLOSURE WITH AN RF-INTERROGATABLE TAG AND MEANS FOR INTERROGATING ARTICLE TAGS AND FOR STORING INDICATIONS OF ARTICLE DESCRIPTIONS IN ARTICLE TAGS THEREBY INTERROGATED, are counterpart to steps S10, S11 and S13 above discussed. Step S18, INTERROGATE TAGS OF SELECTED ARTICLES, STORE ARTICLE DESCRIPTIONS, REMOVE TAGS FROM ARTICLES AND PLACE ARTICLES IN ENCLOSURE, however, looks to a variation in practice, wherein tags do not remain permanently with articles, but are removed once the article is encased and are available for reuse with repeat orders for the same article. Step S19, RF-INTERROGATE ENCLOSURE TAG, is a repeat of the closing steps of the prior described practices.

By way of summary and introduction to the ensuing claims, the invention will be seen to provide a method for processing articles, comprising the steps of defining an article assortment inclusive of articles having different descriptions, distributing the articles into an enclosure and providing the enclosure with an RF-interrogatable unit having stored indications of the descriptions of articles contained therein.

Such method may include the further step, practiced prior to practice of the step of distributing the articles into the enclosure, of providing each of the articles with an RF-interrogatable tag containing stored indication of the article description. In that case, the step of providing the enclosure with an RF-interrogatable unit having stored indications of the descriptions of articles contained therein is practiced in part by interrogating the RF-interrogatable tags.

Otherwise seen, the invention provides a method for processing articles, comprising the steps of defining an article assortment inclusive of articles having different descriptions, distributing the articles into an enclosure, providing the enclosure with an RF-interrogatable unit having stored indications of the descriptions of articles contained therein and RF-interrogating the enclosure RF- interrogatable unit to determine enclosure article contents.

Further, the invention provides a method for processing articles, comprising the steps of defining an article assortment inclusive of articles having different descriptions, distributing the articles into different enclosures, providing each enclosure with an RF-interrogatable unit having stored indications of the descriptions of articles contained therein and RF-interrogating the enclosure RF- interrogatable units to determine enclosure article contents in any one or more of the enclosures.

The various methods above may include the further step, practiced prior to practice of the step of RF-interrogating the enclosure RF- interrogatable units to determine enclosure article contents in any one or more of the enclosures, of dispersing groups of the enclosures to diverse locations and wherein the step of RF-interrogating the enclosure RF-interrogatable units to determine enclosure article contents in any one or more of the enclosures is practiced separately at each diverse location.

A first system of the invention includes an enclosure containing a grouping of the articles and an RF-interrogatable unit with the enclosure and having stored indications of the descriptions of the articles contained therein. Each of the articles may include an RF-interrogatable tag therewith and containing stored indication of the article description. The RF-interrogatable unit may include means for RF-interrogating the RF-interrogatable tags.

A second system of the invention includes an enclosure containing a grouping of the articles, an RF-interrogatable unit with the enclosure and having stored indications of the descriptions of the articles contained therein and RF-interrogating means for RF interrogating the enclosure RF- interrogatable unit to determine enclosure article contents.

A further system in accordance with the invention will be seen to comprise a plurality of enclosures, each containing a grouping of the articles, an RF-interrogatable unit with each the enclosure and having stored indications of the descriptions of the articles contained therein and RF-interrogating means for RF-interrogating the enclosure RF- interrogatable units to determine article contents of one or more of the enclosures.

Various changes in structure to the described systems and modifications in the described practices may evidently be introduced without departing from the invention. Accordingly, it is to be understood that the particularly disclosed and depicted embodiments are intended in an illustrative and not in a limiting sense. The true spirit and scope of the invention are set forth in the following claims.

What is claimed is:

1. A method for processing articles, comprising the steps of:

(a) defining an article assortment inclusive of articles having different descriptions;

(b) distributing said articles into an enclosure; and (c) providing the enclosure with an RF-interrogatable unit including i) a unit memory for storing indications of the descriptions of articles contained in the enclosure;

ii) a detector for detecting an incoming message;

iii) a message assembler for assembling a set of data retrieved from said unit memory into an outgoing message;

iv) a controller operatively connected to said detector for controlling retrieval of a designated data from said unit memory and for controlling said message assembler; and v) an RF transmitter for transmitting the assembled message.

2. The method claimed in claim 1, including the further step, practiced prior to practice of said step of distributing said articles into said enclosure, of providing each of said articles with an RF-interrogatable tag containing stored indication of the article description, said tag including i) a tag memory for storing indication of the article description;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said unit memory and for controlling said message assembler; and v) an RF transmitter for transmitting the assembled message.

3. The method claimed in claim 2, wherein said step of providing the enclosure with an RF-interrogatable unit having stored indications of the descriptions of articles contained therein is practiced in part by interrogating said RF-interrogatable tags.

4. A method for processing articles, comprising the steps of:

(a) defining an article assortment inclusive of articles having different descriptions;

(b) distributing said articles into an enclosure;

(c) providing the enclosure with an RF-interrogatable unit including i) a unit memory for storing indications of the descriptions of articles contained in the enclosure;

ii) a detector for detecting an incoming message;

iii) a message assembler for assembling a set of data retrieved from said memory into an outgoing message;

iv) a controller operatively connected to said detector for controlling retrieval of a designated data from said unit memory and for controlling said message assembler; and v) an RF transmitter for transmitting the assembled message; and (d) RF-interrogating the enclosure RF-interrogatable unit to determine enclosure article contents.

5. The method claimed in claim 4, including the further step, practiced prior to practice of said step of distributing said articles into said enclosure, of providing each of said articles with an RF-interrogatable tag containing stored indication of the article description.

6. The method claimed in claim 5, wherein said step of providing the enclosure with an RF-interrogatable unit having stored indications of the descriptions of articles contained therein is practiced in part by interrogating said RF-interrogatable tags.

7. A method for processing articles, comprising the steps of:

(a) defining an article assortment inclusive of articles having different descriptions;

(b) distributing said articles into different enclosures;

(c) providing each enclosure with an RF-interrogatable unit including i) a unit memory for storing indications of the descriptions of articles contained in the enclosure;

ii) a detector for detecting an incoming message;

iii) a message assembler for assembling a set of data retrieved from said memory into an outgoing message;

iv) a controller operatively connected to said detector for controlling retrieval of a designated data from said unit memory and for controlling said message assembler; and v) an RF transmitter for transmitting the assembled message; and (d) RF-interrogating the enclosure RF-interrogatable units to determine enclosure article contents in any one or more of said enclosures.

8. The method claimed in claim 7, including the further step, practiced prior to practice of said step of distributing said articles into said enclosure, of providing each of said articles with an RF-interrogatable tag including i) a tag memory for storing indications of the article description;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said unit memory and for controlling said message assembler; and v) an RF transmitter for transmitting the assembled message.

9. The method claimed in claim 8, wherein said step of providing each enclosure with an RF-interrogatable unit having stored indications of the descriptions of articles contained therein is practiced in part by interrogating respective RF-interrogatable tags in respective enclosures.

10. The method claimed in claim 7, comprising the further step, practiced prior to practice of said step of RF-interrogating the enclosure RF- interrogatable units to determine enclosure article contents in any one or more of said enclosures, of dispersing groups of said enclosures to diverse locations and wherein said step of RF-interrogating the enclosure RF-interrogatable units to determine enclosure article contents in any one or more of said enclosures is practiced separately at each said diverse location.

11. A system for processing an article assortment inclusive of articles having different descriptions, comprising:

(a) an enclosure containing a grouping of said articles; and (b) an RF-interrogatable unit with said enclosure, said unit including i) a unit memory for storing indications of the descriptions of articles contained in the enclosure;

ii) a detector for detecting an incoming message;

iii) a message assembler for assembling a set of data retrieved from said unit memory into an outgoing message;

iv) a controller operatively connected to said detector for controlling retrieval of a designated data from said unit memory and for controlling said message assembler; and v) an RF transmitter for transmitting the assembled message.

12. The system claimed in claim 11, wherein each of said articles includes an RF-interrogatable tag, said tag including i) a tag memory for storing indication of the article description;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said tag memory and for controlling said message assembler; and v) an RF transmitter for transmitting the assembled message.

13. The system claimed in claim 12, wherein said RF-interrogatable unit includes a tag interrogator for RF-interrogating said RF-interrogatable tags.

14. A system for processing an article assortment inclusive of articles having different descriptions, comprising:

(a) an enclosure containing a grouping of said articles;

(b) an RF-interrogatable unit with said enclosure, said unit including i) a unit memory for storing indications of the descriptions of articles contained in the enclosure;

ii) a detector for detecting an incoming message;

iii) a message assembler for assembling a set of data retrieved from said unit memory into an outgoing message;

iv) a controller operatively connected to said detector for controlling retrieval of a designated data from said unit memory and for controlling said message assembler; and v) an RF transmitter for transmitting the assembled message;

(c) an enclosure RF-interrogator for RF interrogating the enclosure RF-interrogatable unit to determine enclosure article contents.

15. The system claimed in claim 14, wherein each of said articles includes an RF-interrogatable tag including i) a tag memory for storing indication of the article description;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said tag memory and for controlling said message assembler; and v) an RF transmitter for transmitting the assembled message.

16. The system claimed in claim 15, wherein said RF-interrogatable unit includes a tag interrogator for RF-interrogating said RF-interrogatable tags.

17. A system for processing an article assortment inclusive of articles having different descriptions, comprising:

(a) a plurality of enclosures, each containing a grouping of said articles;

(b) an RF-interrogatable unit with each said enclosures, said unit including i) a unit memory for storing indications of the descriptions of articles contained in the enclosure;

ii) a detector for detecting an incoming message;

iii) a message assembler for assembling a set of data retrieved from said unit memory into an outgoing message;

iv) a controller operatively connected to said detector for controlling retrieval of a designated data from said unit memory and for controlling said message assembler; and v) an RF transmitter for transmitting the assembled message; and (c) an enclosure RF-interrogator for RF-interrogating the enclosure RF-interrogatable units to determine article contents of one or more of said enclosures.

18. The system claimed in claim 17, wherein each of said articles includes an RF-interrogatable tag including i) a tag memory for storing indication of the article description;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said tag memory and for controlling said message assembler; and v) an RF transmitter for transmitting the assembled message.

19. The system claimed in claim 18, wherein said RF-interrogatable unit includes a tag interrogator for RF-interrogating said RF-interrogatable tags.

20. In combination:

(a) a plurality of articles;

(b) a plurality of enclosures each containing a portion of said plurality of said articles;

(c) an RF interrogatable tag with each article, said tag including i) a tag memory for storing RF interrogatable information indicative of the article;

ii) a tag detector for detecting an incoming message;

iii) a tag message assembler for assembling a set of data retrieved from said tag memory into an outgoing tag message;

iv) a controller operatively connected to said detector for controlling retrieval of a designated data from said tag memory and for controlling said message assembler; and v) an RF transmitter for transmitting the assembled message; and (d) a tag RF interrogator for interrogating said tags in said enclosures and for storing the information indicative of said articles.

21. The invention claimed in claim 20, wherein said tag RF interrogator is itself RF interrogatable to provide an RF transmission indicative of its stored information.

22. The invention claimed in claim 21, including a further an enclosure RF interrogator for interrogating the first-mentioned tag RF interrogator, said enclosure RF interrogator having an interrogator memory for storing the transmissions of said first-mentioned tag RF interrogator.

* * * * *